Nov. 30, 1965 A. MALCHAIR 3,220,438

BRAKING DEVICE FOR INSTANTANEOUSLY STOPPING CIRCULAR LOOMS

Filed Oct. 24, 1962 4 Sheets-Sheet 1

INVENTOR:
Armand Malchair
BY
Richards & Geier
ATTORNEYS

INVENTOR:
Armand Malchair
BY
Richards & Geier
ATTORNEYS

BRAKING DEVICE FOR INSTANTANEOUSLY STOPPING CIRCULAR LOOMS
Filed Oct. 24, 1962 4 Sheets-Sheet 3
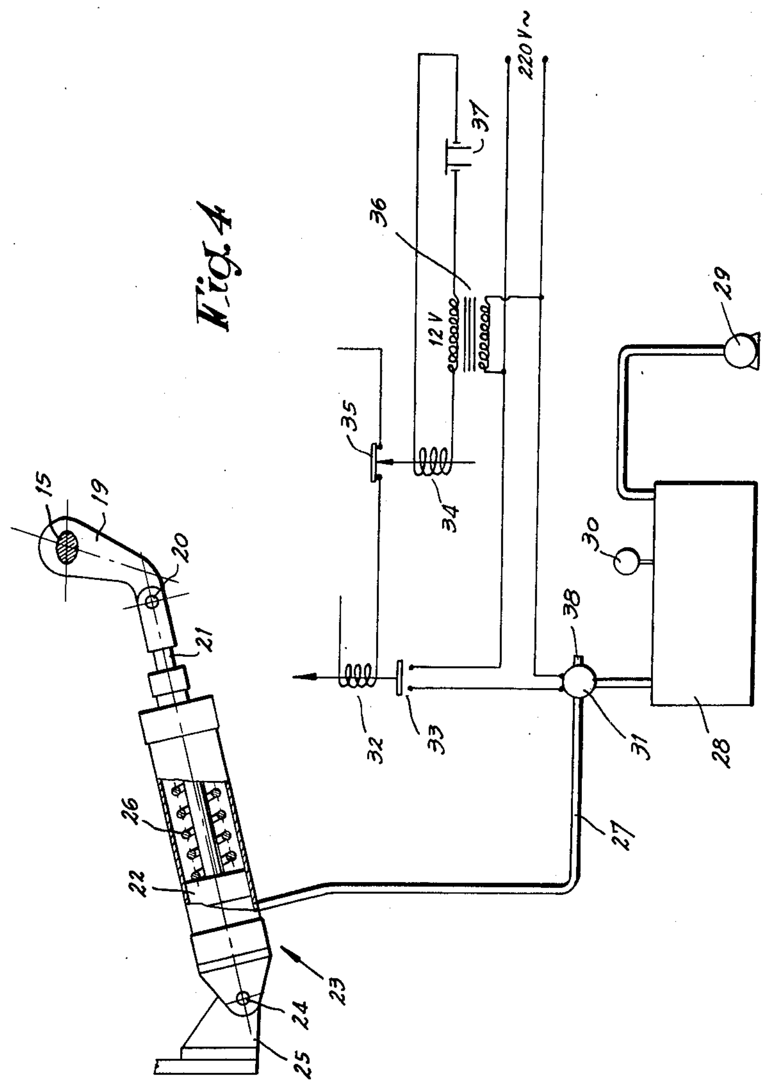
INVENTOR:
Armand Malchair
BY
Richards & Geier
ATTORNEYS Nov. 30, 1965 A. MALCHAIR 3,220,438
BRAKING DEVICE FOR INSTANTANEOUSLY STOPPING CIRCULAR LOOMS
Filed Oct. 24, 1962 4 Sheets-Sheet 4
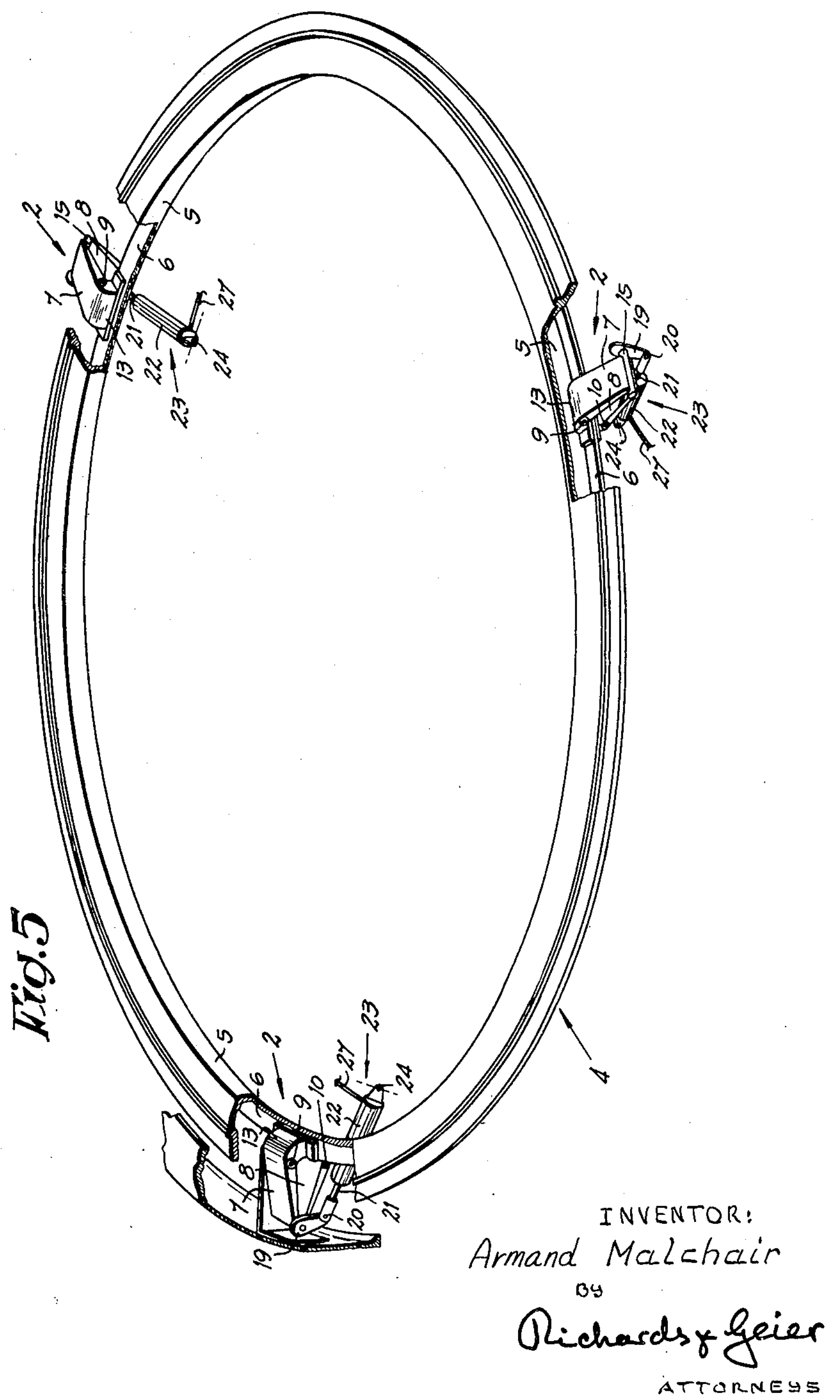
INVENTOR:
Armand Malchair
BY
Richards & Geier
ATTORNEYS United States Patent Office 3,220,438

Patented Nov. 30, 1965

3,220,438

BRAKING DEVICE FOR INSTANTANEOUSLY STOPPING CIRCULAR LOOMS

Armand Malchair, Herstal, Belgium, assignor to Societe Anonyme Iwan Simonis S.A., Verviers, Belgium Filed Oct. 24, 1962, Ser. No. 232,680
Claims priority, application Belgium, Oct. 26, 1961, 609,599
7 Claims. (Cl. 139—13)

It is well known that it is essential to stop almost instantaneously any loom upon the occurrence of any operational malfunction therein, which may damage the textile being produced or endanger some parts of the loom.

In circular looms, the nearly instantaneous stopping is very important as the linear speeds are very high, and since the rotating movement is continuous, there are no periodical stoppings of shuttle, as occurs in the straight type looms wherever the shuttle comes into the bottom of the shuttle box.

This invention relates to a very simple and efficient braking device for circular looms which requires a very reduced driving power as well as very reduced movements of the proper braking elements.

Substantially, a first feature of this braking device is that the braking strain is applied directly on a point relatively removed from the axis of the rotating system, whereby the braking torque may be high together with a relatively reduced strain.

To apply this criterion, there is used the combination of a crown integral with the rotating system to be secured and of at least a pair of braking jaws, the operating positions of which are controlled by a mechanism which, in turn, is controlled by any suitable mechanism for detecting a breakage in the yarn, weft, etc.

According to another feature of the invention, the pair or the pairs of jaws are acting upon the said crown integral with the rotating system in a direction parallel or nearly parallel with the rotating axis, so that the braking strain is in a manner directed perpendicularly with the plane in which the said rotating crown is moved.

Independently from the fact that such stress is less detrimental to the rotating system than the tangential stresses generally applied for braking the rotating moving parts, there is still obtained that the braking surface is in a manner independent from the thickness of the rotating crown.

Thus, it is now possible to provide a large braking surface with a reduced mass crown, all conditions which are favourable to a rational and strong braking.

According to another feature of the invention, the position of the jaws of the proper braking device are controlled by a fluid under pressure, the admission or the removal of which are determined by a valve controlled by an electromagnetic device actuated by the said driving elements.

By this characteristical arrangement, the mechanical connections are reduced to no more than necessary. It results that not only a very rapid driving of the braking device may be realized, but also that there have been reduced to a minimum the setting out of order and play causes, which are particularly detrimental in relatively complex mechanical drivings.

The jaws, the fluid under pressure device and the disposition of the electromagnetic circuit from the said driving elements are essentially variable because of the numerous means available for those skilled in the art to realize these essential parts of the apparatus according to the invention. It is the reason why this invention covers any embodiment thereof. An embodiment of the invention will be now described in details with reference to the enclosed drawings, in which:

FIGURE 4 is a diagram illustrating the connections between the braking device and the warp protector; and FIGURE 5 is a diagrammatic perspective view of the rotating system of the loom and the brake and cylinder spacings about the latter.

Figure 1:
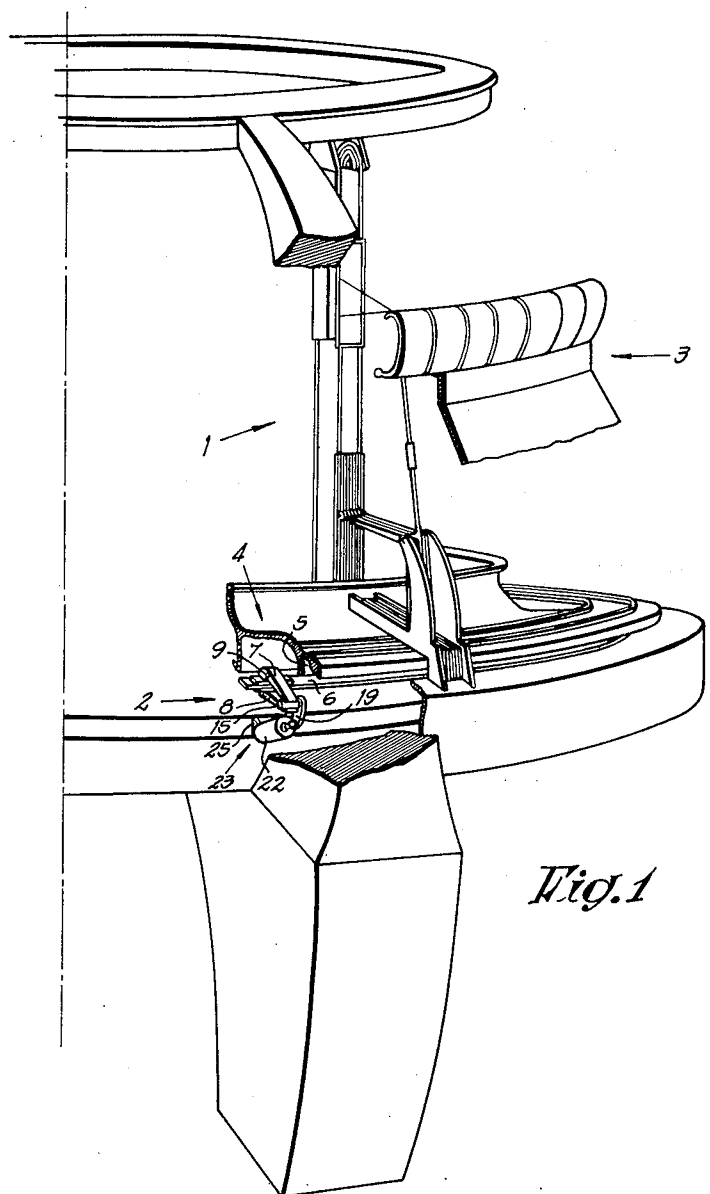
FIGURE 1 is a diagrammatic perspective view, partially in section, of one half of a circular loom provided with a braking device of the present invention, and illustrates the arrangement of the braking device relatively to the main component parts of the loom.

As shown diagrammatically in FIGS. 1 and 5, the circular loom is of the type disclosed in my co-pending application Serial No. 232,711, filed October 24, 1962, and consists of an assembly of complexes disposed concentrically about a vertical axis, each complex comprising substantially at least an apparatus for heddle frames 1, a driving and programming device 2 with a compensating means 3, and a rotating system 4 common to all the above isocentric complexes. In view of applying the braking device according to the invention, the said rotating system has a crown 5 having an annular peripheral edge 6, on which the pair or the pairs of jaws forming a characteristical arrangement of the invention act. In the example illustrated three braking devices are used, each braking cylinder having its own fluid supply and control switches.

Figure 2:
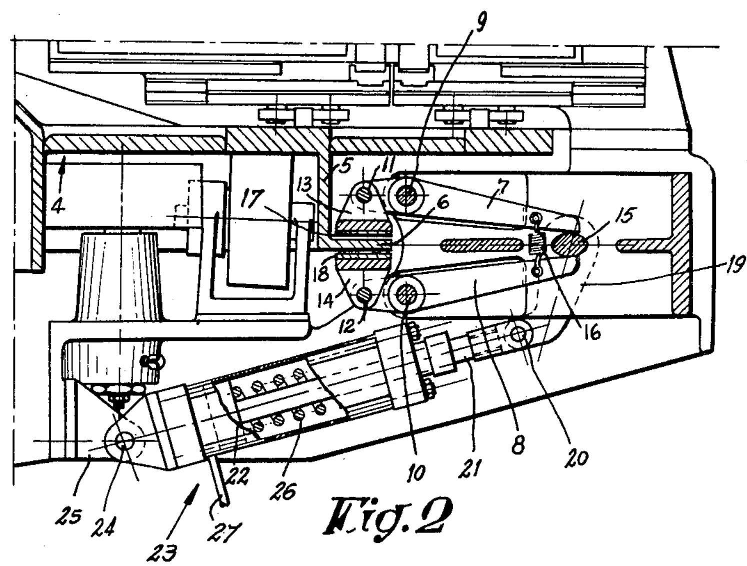
FIGURE 2 is a radial section of the braking device and associated parts, looking in the direction of the arrow 2 of FIG. 1, the braking device being shown in its open position.
Figure 3:
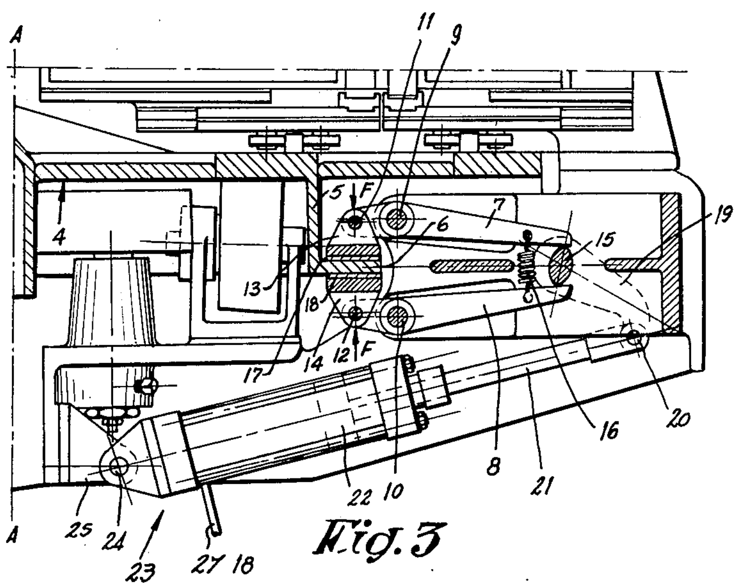
FIGURE 3 is similar to FIG. 2, but shows the braking device in its closed or active position.

As summarily represented in FIGURES 2 and 3, one pair of jaws consists substantially of two levers 7 and 8, which may swing about stationary axes 9 and 10 respectively. Brake shoes 13 and 14 are articulated on axis 11 and 12 respectively on one of the ends of the said levers. At the other end, the said levers 7 and 8 are permanently contacting a cam 15, this permanent contact being provided by the pull exerted on the said lever by an intermediate release spring 16. A layer of material having a high friction coefficient is interposed between the annular edge 6 and the brake shoes 13 and 14. This material may be applied on the said annular edge and/or on the said shoes.

In the example represented in FIGURES 2, 3 and 4, a layer 17 and 18 of such material is integral with the said shoes 13 and 14, respectively. The said cam 15 is integral with one of the ends of a connecting rod 19, the other end of which is articulated through a pivot 20 on the free end of the piston rod 21 of a pneumatic jack, the body or cylinder 23 of which is itself articulated through a pivot 24 on the stationary frame 25 of the loom. The said cam 15 is permanently actuated towards its blind position, i.e., the normal open position of the shoes 13 and 14 as seen in FIGURE 2, the piston 22 of the jack being permanently actuated by the release spring 26. The bottom of the body or cylinder 23 is connected through a pipe 27 with a tank 28, in which is kept, through a compressor 29, a constant pressure duly controlled by a well known minimum-maximum device represented in 30. An electro-valve 31 controls the said pipe 27 and the circuit of the said valve is itself controlled by an electromagnetic device comprising for instance two relays comprising coil 32 and contact 33 and coil 34 and contact 35, respectively, a transformer 36 and the mechanism 37 for detecting a breakage in the yarn. The relay 34–35 is controlled by a manually operated starting and stopping knob (not repreesnted). The said valve 31 is capable of connecting the cylinder 23 either with the tank 28 or with the atmosphere through the exhaust pipe 38.

By this way, when the yarn is broken, the coil 34 is automatically energized by the mechanism 37 for detecting a breakage in the yarn, the energization of coil 34, resulting in the opening of the contact 35, thereby interrupting the electric circuit of the coil 32, whereby the contact 33 together with the feeding circuit of the valve 31 are closed. The said valve 31 comes instantaneously into the position corresponding to the connection between the bottom of the cylinder 23 and the tank 28. The compressed fluid drives back instantaneously the piston 22 which rotates the cam 15 and brings it into the position represented in FIGURE 3. Both shoes 13 and 14 are instantaneously moved to a closed position applying firmly a braking force through a large surface on the corresponding portions of the annular edge 6, thereby securing the rotating system without any sliding.

It will be observed that the said brake shoes are actuated in the direction of the arrows F (FIGURE 3), namely in a parallel direction with the vertical rotating axis A—A of the moving system being braked, which is the direction perpendicular to the crown.

A number of such braking or stopping devices may be suitably distributed on the periphery of the said annular edge 6.

What is claimed is:

1. In a circular loom having an assembly of complexes disposed concentrically about a vertical axis, each complex comprising heddle frames, a programming device, compensating means and a braking device for stopping the loom, said loom further having a rotating system common to all of the complexes, said braking device comprising in combination: a crown integral with the rotating system and having an annular peripheral edge extending perpendicular to said vertical axis; at least one pair of movable jaws supported adjacent said crown and on opposite sides of said peripheral edge; and means for moving said jaws in opposite directions parallel to said vertical axis and into engagement with said peripheral edge.

2. A braking device according to claim 1, characterized in that each pair of jaws consists of two swinging levers, a separate brake shoe articulated at one end of each lever, a cam engaging the other ends of said lever for swinging said levers in opposite direction, and resilient means connected with said levers and tending to urge said levers into contact with said cam.

3. A braking device according to claim 2, characterized in that said peripheral edge has parallel upper and lower surfaces, and said brake shoes engage said parallel surfaces for exerting a pressure perpendicularly to said crown in two opposite directions parallel with the vertical axis of the said rotating assembly.

4. A braking device according to claim 3, characterized in that a layer of a material having a high friction coefficient is interposed between each brake shoe and the annular peripheral edge integral with the rotating assembly.

5. A braking device according to claim 4, characterized in that said material is connected to the shoes.

6. A braking device according to claim 2, characterized in that said cam is integral with one of the ends of a connecting rod, said cam being driven by means including a pneumatic cylinder, a piston slidably supported in said cylinder, a piston rod connected at one end to said piston and at its other end to said connecting rod, a source of fluid under pressure, conduit means connecting said source with said cylinder, means for detecting yarn breakage in said loom, and means operatively connecting said detecting means with said conduit means for controlling the flow of fluid to said cylinder.

7. A braking device according to claim 6, characterized in that the cylinder is articulated to the frame of the loom and is connected through an electro-valve with said source of fluid under pressure.

References Cited by the Examiner

UNITED STATES PATENTS

| | | | |
|---|---|---|---|
| 2,027,459 | 1/1936 | Yeadon | 139—13 |
| 2,080,819 | 5/1937 | Hale et al. | 139—13 |
| 2,091,333 | 8/1937 | Pool | 139—13 |
| 2,129,736 | 9/1938 | Hale et al. | 139—13 |
| 3,047,030 | 7/1962 | Metzler | 139—336 |

DONALD W. PARKER, *Primary Examiner.*

RUSSELL C. MADER, *Examiner.*